United States Patent [19]

Togari et al.

[11] 4,440,631

[45] Apr. 3, 1984

[54] PROCESS FOR HYDROCRACKING HEAVY HYDROCARBON OILS AND CATALYST THEREFOR

[75] Inventors: Osamu Togari; Masatoshi Matsuda; Kenji Shimokawa, all of Yokohama; Toshiji Makabe, Kawasaki, all of Japan

[73] Assignee: Chiyoda Chemical Engineering & Construction Co., Ltd., Yokohama, Japan

[21] Appl. No.: 504,439

[22] Filed: Jun. 15, 1983

[30] Foreign Application Priority Data

Jun. 15, 1982 [JP] Japan .................. 57-101378

[51] Int. Cl.$^3$ ............... C10G 47/12; C10G 47/10
[52] U.S. Cl. .................. 208/112; 208/111; 502/242; 502/247; 502/248; 502/255; 502/302
[58] Field of Search ............ 252/461, 464, 465, 469, 252/455 R, 439, 437, 432; 208/112, 111

[56] References Cited

U.S. PATENT DOCUMENTS

| | | |
|---|---|---|
| 2,817,626 | 12/1957 | Mabry, Jr. et al. ............. 252/464 |
| 3,200,063 | 8/1965 | Wilson ........................ 252/455 R |
| 3,269,958 | 8/1966 | Gatsis ......................... 252/464 |
| 3,824,180 | 7/1974 | Hilfman ....................... 252/464 |
| 3,849,292 | 11/1974 | Gleim ......................... 252/464 |
| 3,884,798 | 5/1975 | Hilfman ....................... 252/439 |
| 4,077,912 | 3/1978 | Dolhyj et al. ................. 252/461 |
| 4,279,777 | 7/1981 | Veleny et al. ................. 252/439 |
| 4,389,304 | 6/1983 | Eastman et al. ................ 252/465 |
| 4,394,301 | 7/1983 | Gardner ....................... 252/439 |
| 4,395,329 | 7/1983 | Le Page et al. ............... 208/251 H |

FOREIGN PATENT DOCUMENTS 67708 6/1982 European Pat. Off. ........ 252/455 R

*Primary Examiner*—Delbert E. Gantz
*Assistant Examiner*—Anthony McFarlane
*Attorney, Agent, or Firm*—Armstrong, Nikaido, Marmelstein & Kubovcik

[57] ABSTRACT

A catalyst for hydrocracking heavy hydrocarbon oils includes a porous inorganic carrier composed mainly of alumina or titania, and two or more catalytic metal components composited with the carrier. The metals of the catalytic metal components are either (a) V and at least one element selected from Zn, Fe, Co, Ni, Cu, Ag, Sn and Pb or (b) Mo and at least one element selected from Zn, Cu, Ag, Sn, Pb and the lanthanum-series elements. The catalyst has at least 60% of its total pore volume in pores with a diameter of 200 Å or more, at least 40% of its total pore volume in pores with a diameter of 300 Å or more and not more than 20% of its total pore volume in pores with a diameter of at least 1000 Å. Disclosed also is a process for hydrocracking a heavy hydrocarbon oil in the presence of the above catalyst.

6 Claims, 5 Drawing Figures

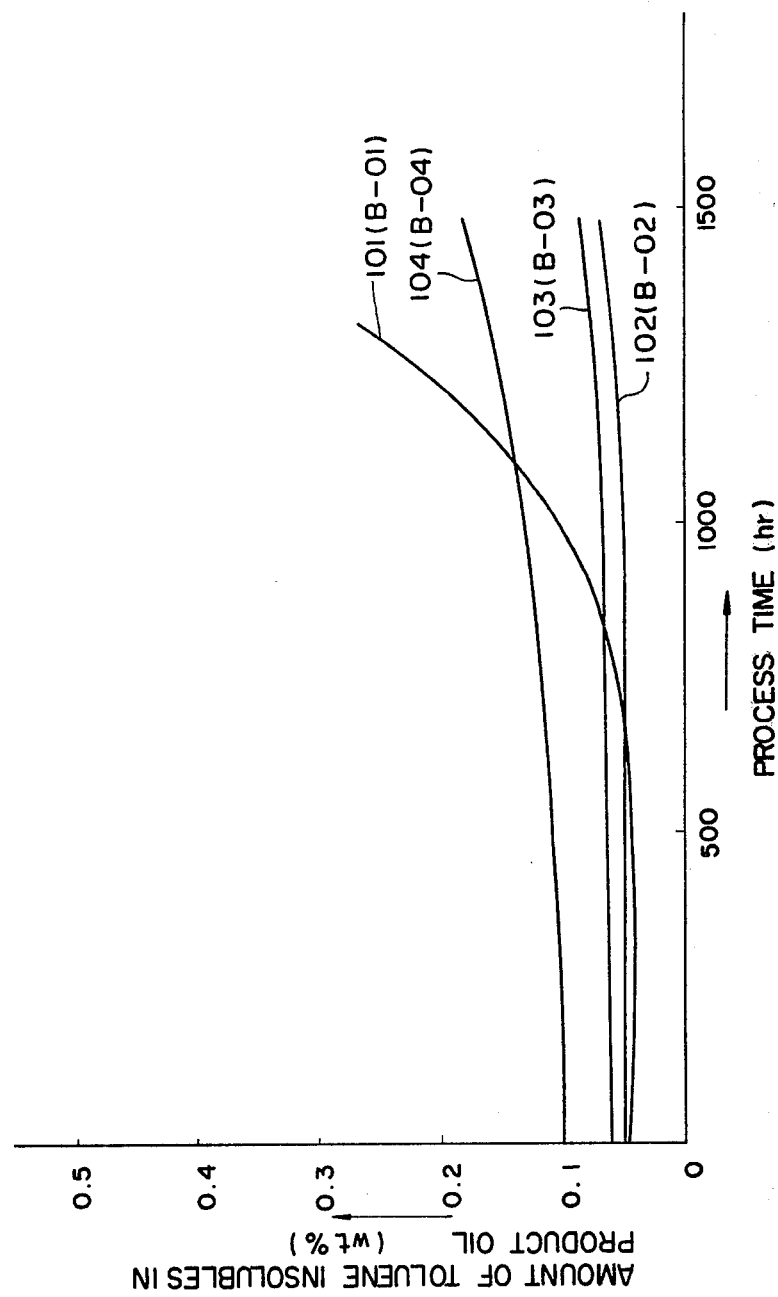

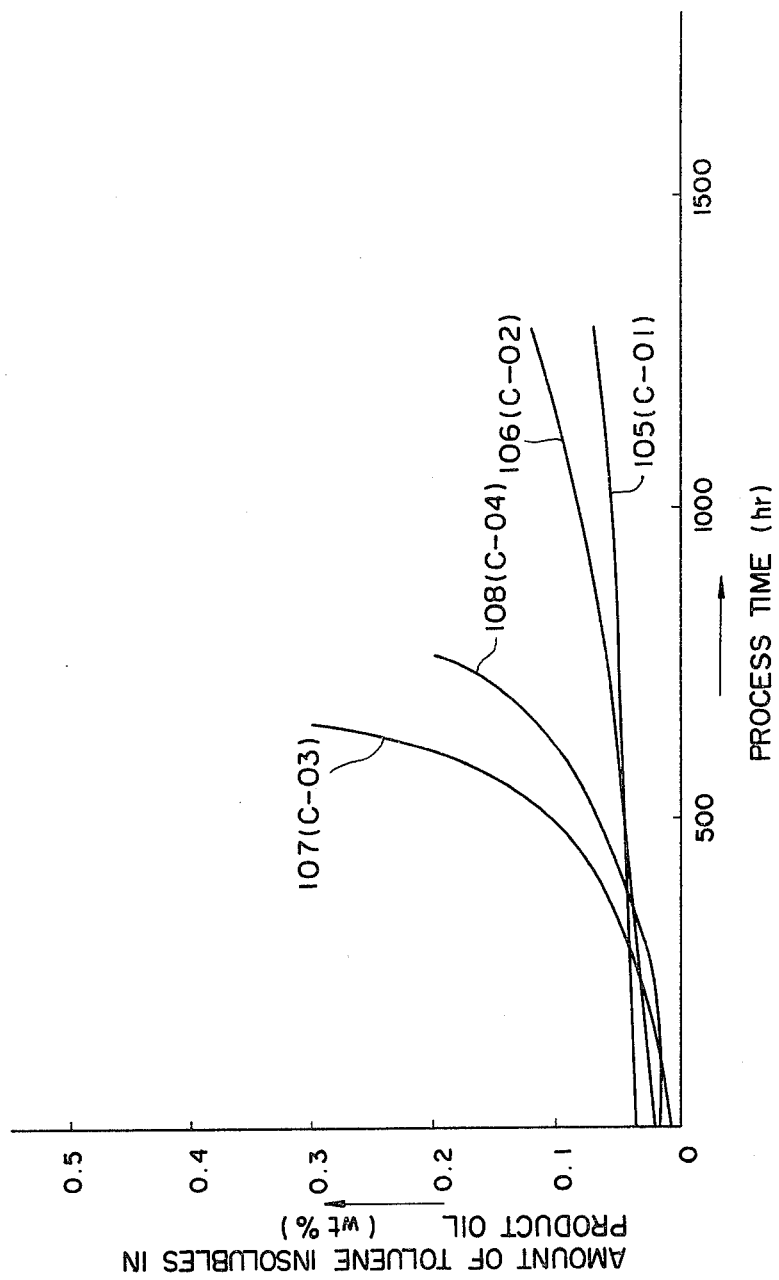

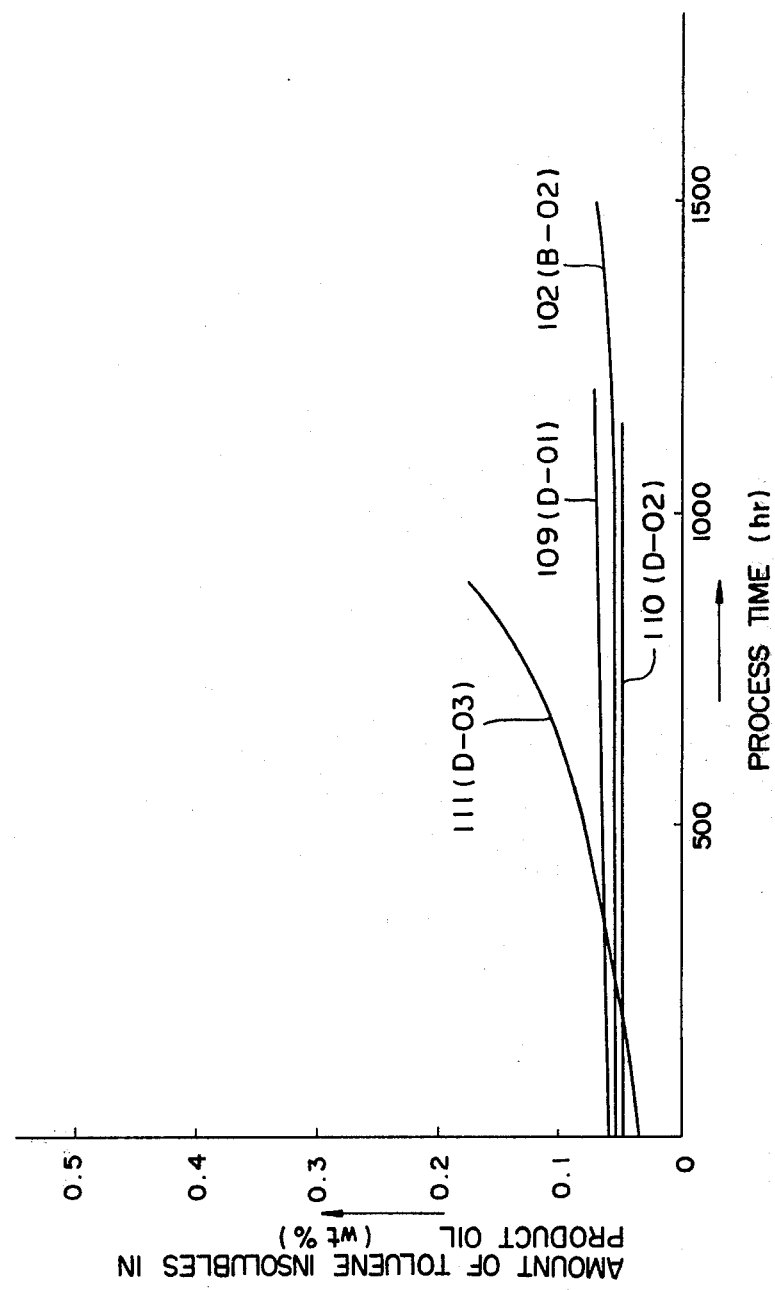

FIG. 4(a)

| | |
|---|---|
| | B-02 (V-Cu) |
| R-1 | V-Cu |
| 1 | Ni |
| 2 | V-Fe |
| 3 | Pd |
| 4 | Mo-Na |
| 5 | V-Sn |
| 6 | Cr-Ni |
| 7 | Mo |
| 8 | V-Zn |
| 9 | U |
| 10 | Co |
| 11 | V-Na |
| 12 | Mo-Zn |
| 13 | Cr |
| 14 | V-Rh |
| 15 | Mo-Sn |
| 16 | Pt |
| 17 | V-Cd |
| 18 | Mo-Co |
| R-2 | V-Cu |

FIG. 4(b)

| | |
|---|---|
| | B-02 (V-Cu) |
| R-3 | V-Cu |
| 19 | Cu |
| 20 | V-Ag |
| 21 | Mo-Ni |
| 22 | Ag |
| 23 | V-Mg |
| 24 | Mo-Ce |
| 25 | V-Cr |
| 26 | V |
| 27 | Cr-Co |
| 28 | Mo-Ag |
| 29 | V-Mo |
| 30 | W-Ni |
| 31 | W |
| 32 | V-La |
| 33 | Fe |
| 34 | Mo-Pb |
| 35 | V-Co |
| 36 | Rh |
| R-4 | V-Cu |

PROCESS FOR HYDROCRACKING HEAVY HYDROCARBON OILS AND CATALYST THEREFOR

This invention relates generally to a catalyst for treating heavy hydrocarbon oils and, more specifically, to a catalyst for hydrocracking heavy hydrocarbon oils into light hydrocarbon oils.

Nowadays, a demand for heavy hydrocarbon oils such as reduced crude oils, residual oils and certain crude oils is decreasing because of their high viscosity and difficulty in handling and because of their high content of sulfur and nitrogen components which form $SO_x$ and $NO_x$ when combusted. On the other hand, light hydrocarbon oils such as kerosene and gas oil are now in great demands. In these circumstances, the establishment of effective techniques for converting heavy hydrocarbon oils into light hydrocarbon oils is strongly desired.

Catalytic hydrocracking is widely known to be effective in obtaining low boiling point oils. However, it involves a lot of problems when applied to the hydroconversion of heavy hydrocarbon oils. Firstly, it encounters with a problem of catalyst poisoning. As the hydrocracking of the heavy hydrocarbon oil proceeds, polycondensed, high molecular weight hydrocarbons contained therein tend to form coke on the active cites of the catalyst and accumulate within the pores of the catalyst so that the catalytic activity is considerably lowered. Since the higher the catalytic activity, the faster becomes the rate of coking, i.e. the rate of catalyst poisoning, a highly active catalyst for hydrocracking heavy hydrocarbon oils has not been used on an industrial scale with satisfactory results. Secondly, when the hydrocracking is performed at a high temperature to facilitate the hydrocracking and thermal cracking, thermal polycondensation of heavy components also occurs very fast to form a large amount of carbonaceous matters dispersed in the oil without being bound with the catalyst. (Hereinafter, except otherwise noted, the term "carbonaceous matters" is intended to mean those which are present in the oil without entering into the pores of the catalyst.) A part of the carbonaceous matters thus formed may deposit and accumulate within the catalyst bed and inside the joints and pipes of the reaction apparatus to cause the blockage of the fluid flow therethrough.

To cope with the above-described problems, a variety of methods have been proposed in the prior art. For example, U.S. Pat. No. 3,338,820 suggests a method of catalytic hydrocracking of heavy hydrocarbon oils in which a mixture of the feedstock and hydrogen is fed from the bottom of the reactor at a velocity and a pressure sufficient to maintain the catalyst in the reactor in a fluidized state and in which a portion of the catalyst in the reactor is continuously discharged therefrom while continuously supplying a fresh catalyst from the top of the reactor. Although the use of the fluidized bed system can obviate the problem of the plugging of the catalyst bed, the pipes through which the catalyst passes are liable to cause troubles.

U.S. Pat. Nos. 3,622,498 and 4,214,977 propose the use of a finely divided catalyst which is, after being mixed with the feedstock, fed to the reactor for hydrocracking. Whilst this method also overcomes the problem of the plugging of the catalyst bed, the passages for the catalyst particles tend to be blocked especially when the amount of the catalyst relative to the oil is increased.

U.S. Pat. No. 4,134,825 suggests introducing a mixture of the feedstock and a Mo-containing compound into a reactor for the treatment thereof at a high temperature and a high hydrogen pressure with an improved conversion while minimizing the formation of carbonaceous matters. This method is, however, not advantageous from an economic point of view, since the Mo compound which is expensive must be continuously supplied to the reaction zone and consumed there.

Thus, in the prior art processes, the problem of catalyst poisoning by coke deposition is avoided by continuous replacement of the fresh catalyst for the aged catalyst and the problem of plugging of the catalyst bed by carbonaceous matters is coped with by the use of a fluidized bed or slurry catalyst. The use of fluidized bed system is, however, not advantageous as compared with a fixed bed system because the fluidized bed system requires a large apparatus and complicated operations. Further, the prior art processes still encounter with the above-described problems.

The present invention has been made from a consideration of the above-discussed problems of known processes.

In accordance with the present invention there is provided a catalyst for hydrocracking heavy hydrocarbon oils, comprising:

a porous inorganic carrier composed mainly of alumina or titania; and two or more catalytic metal components composited with said carrier, the metals of said catalytic metal components being either (a) V and at least one first auxiliary element selected from the group consisting of Zn, Fe, Co, Ni, Cu, Ag, Sn and Pb or (b) Mo and at least one second auxiliary element selected from the group consisting of Zn, Cu, Ag, Sn, Pb and the lanthanum-series elements, said catalyst having at least 60% of its total pore volume in pores with a diameter of 200 Å or more, at least 40% of its total pore volume in pores with a diameter of 300 Å or more and not more than 20% of its total pore volume in pores with a diameter of at least 1000 Å.

In another aspect of the present invention, there is provided a process for hydrocracking a heavy hydrocarbon oil, comprising contacting the heavy hydrocarbon oil with a catalyst at a temperature of 420°–480° C., a hydrogen pressure of 100–250 Kg/cm² and a liquid hourly space velocity of 0.1–10 $hr^{-1}$, said catalyst including a porous inorganic carrier composed mainly of alumina or titania, and two or more catalytic metal components composited with said carrier, the metals of said catalytic metal components being either (a) V and at least one first auxiliary element selected from the group consisting of Zn, Fe, Co, Ni, Cu, Ag, Sn and Pb or (b) Mo and at least one second auxiliary element selected from the group consisting of Zn, Cu, Ag, Sn, Pb and the lanthanum-series elements, and said catalyst having at least 60% of its total pore volume in pores with a diameter of 200 Å or more, at least 40% of its total pore volume in pores with a diameter of 300 Å or more and not more than 20% of its total pore volume in pores with a diameter of at least 1000 Å.

The catalyst according to the present invention is effective in preventing carbonaceous matters from forming during hydrocracking even if the hydrocracking is performed at a high temperature. Moreover, even when the catalyst of the present invention is used for a long period of time and has a coke deposit within its pores, it can still exhibit a high catalytic activity. Therefore, the catalyt of this invention may be advantageously applied to a fixed bed system for hydrocracking heavy hydrocarbon oils.

The catalyst of this invention is featured in (1) catalytic metal components, (2) pore characteristics and (3) carrier. These features will be more specifically described hereinbelow.

(1) The catalyst must contain two or more catalytic metal components and the metals of the catalytic metal components must include either V or Mo as a main element. Further, V must be used in combination with at least one first auxiliary element selected from Zn, Fe, Co, Ni, Cu, Ag, Sn and Pb while Mo must be used in combination with at least one second auxiliary element selected from Zn, Cu, Ag, Sn, Pb and the lanthanum-series elements. The lanthanum-series elements herein include La and the 14 lanthanide elements. The catalytic metal components are generally in the form of oxides and/or sulfides.

(2) The catalyst must have the following pore characteristics:

(i) The volume of pores with a diameter of at least 200 Å must be at least 60% of the total pore volume;

(ii) The volume of pores with a diameter of at least 300 Å must be at least 40% of the total pore volume; and (iii) The volume of pores with a diameter of at least 1000 Å must be 20% or less of the total pore volume.

(3) The carrier must be composed mainly of alumina or titania. Other conventionally employed inorganic oxides may be used together with alumina or titania. Illustrative of suitable mixed oxide carriers are a combination of 1 part by weight of alumina with no more than 1 part by weight of silica, titania and/or zirconia, a combination of 1 part by weight of alumina with no more than 0.3 parts by weight of boria and/or phosphia, a combination of 1 part by weight of titania with no more than 1 part by weight of alumina, silica and/or zirconia, and a combination of 1 part by weight of titania with no more than 0.3 parts by weight of boria and/or phosphia.

In general, when a heavy hydrocarbon oil is subjected to catalytic hydrocracking conditions, thermal cleavage of weak bonds, such as dibenzyl bonds and thioether bonds, of the hydrocarbon molecules occurs, in addition to the hydrocracking which occurs on the surfaces or at the active cites of the catalyst, to form hydrocarbon radicals. The thus formed hydrocarbon radicals, in the atmosphere lacking in active hydrogen, are stabilized through polymerization, abstraction of hydrogen from other molecules, dispropornation upon collision with inert surfaces, and like reactions. All of these reactions facilitate the formation of carbonaceous matters and represent an undesirable aspect of thermal cracking. In order to prevent the occurrence of such reactions resulting in the formation of carbonaceous matters, it is necessary that the hydrocarbon radicals should be saturated with hydrogen as soon as they are formed.

In this regard, the use of a hydrogenation catalyst is very effective. That is, the hydrogenation catalyst can directly transfer active hydrogen to the hydrocarbon radicals or olefins formed by the disproporonation of the hydrocarbon radicals, thereby forming stable hydrocarbon molecules. Additionally, the hydrogenation catalyst can indirectly provide the hydrocarbon radicals with hydrogen through hydrogen-donative molecules, such as naphthenic aromatics. Namely, the hydrocarbon radicals abstract hydrogen atoms from the hydrogen-donative molecules and the hydrogenation catalyst can regenerate the resulting molecules which have lost their hydrogen.

Various catalysts having metal components supported on porous inorganic carriers have more or less such a hydrogen-activation property. Above all, so called hydrodesulfurization catalyst having, for example, a combination of Mo-Co, Mo-Ni or W-Ni is known to exhibit both a remarkable hydrogen activation property and a high hydrocracking activity in the presence of sulfur and, therefore, is usually used for hydrocracking heavy hydrocarbon oils. However, known hydrodesulfurization catalysts of this type are liable to be poisoned by nitrogen compounds contained in the feedstock especially when the hydrocracking is performed at a temperature of below 400° C. Thus, in order to effect the hydrocracking with a high conversion, it is necessary to carry out the hydrocracking at a temperature of 420° C. or more so that the desorption of nitrogen compounds from the catalyst becomes vigorous. For example, in a process disclosed in U.S. Pat. No. 3,998,722 a heavy hydrocarbon oil is hydrocracked at a temperature of about 426° C. in the presence of a hydrodesulfurization catalyst with a 538° C.+ conversion of about 30%. It has been found, however, that when the hydrocracking is performed at a temperature of 420° C. or more in the presence of such a hydrodesulfurization catalyst, carbonaceous matters are formed in a large amount and deposit within the catalyst bed. As a result, the catalyst loses not only its hydrocracking activity but also its hydrogenation activity within a short period of time and hence, the catalyst cannot exhibit an activity of preventing the formation of carbonacesus matters any more.

On the other hand, the catalyst of the present invention has a high hydrogenaction activity and, moreover, the rate of deposition of carbonaceous matters on the catalyst bed is slow even when the hydrocracking is performed at a temperature higher than 420° C. Thus, with the catalyst of this invention, the hydrocracking of the heavy hydrocarbon oils can be effected for a long period of time while preventing the formation of carbonaceous matters.

In order for the catalyst to exhibit such an improved catalyst life, it is essential that the catalyst contains two or more catalytic metal components of the aforementioned specific combination, i.e. a combination of V with one or more first auxiliary elements or a combination of Mo with one or more second auxiliary elements. The catalytic activity of the Mo-carrying catalyst of the present invention is little affected by deposition of coke within its pores. For example, the Mo-carrying catalyst will still exhibit a high hydrogenation activity and can prevent the formation of carbonaceous matters even if about half of its pore volume is plugged with coke. Such a property is specific to Mo, and other Group VIa metals such as Cr and W, do not possess such a property. However, Mo should be used in combination with the second auxiliary element, since otherwise carbonaceous matters will deposit on the outer surfaces of the catalyst in a large amount within a short period of time to the extent that the catalyst can no more exhibit its catalytic activity. Unlike other Group Va metals such as Nb and Ta, V has also the property similar to Mo, though the hydrogenation activity in preventing the formation of carbonaceous matters in the case of V-carrying catalyst is lower and is more affected by the coke deposit within its pores in comparison with the Mo-carrying catalyst. However, the rate of deposition of coke on V-carrying catalyst is much lower than that on the Mo-carrying catalyst, though the use of V by itself as metal of the catalytic metal component is insufficient to provide the catalyst with satisfactory catalyst life. Thus, V is used in combination with the first auxiliary element which serves to lower the rate of deposition of coke on the catalyst.

The amount of the catalyst metal components may vary according to the kind and physical properties of the carrier. Generally, too low an amount of the catalyst metal components results in the lack of catalytic activity, while an excessively large amount of the catalytic metal components cause the reduction in pore volume of the catalyst and the maldistribution of the catalyst metal components, resulting in the reduction in catalytic activity. Preferably, the content of V or Mo in the catalyst of this invention is $0.3 \times 10^{-5}$ to $1.5 \times 10^{-5}$ mol per 1 m$^2$ of the surface area of the catalyst, that is, 0.3–1.5 millimol per 100 m$^2$/g of the specific surface area of the catalyst. The amount of the first and second auxiliary elements, which are respectively used in combination with V and Mo and which serve to reduce the rate of deposition of coke on the respective catalysts, is preferably such that an atomic ratio Y/X, where X is the number of V or Mo atoms and Y is the number of the first or second auxiliary element or elements, ranges from 0.1 to 3, more preferably from 0.3 to 1.5.

The pore distribution of the catalyst is also one of the factors in determining the catalyst life. It is generally known that the pore distribution of a catalyst for hydrotreating heavy hydrocarbon oils has a great influence upon both its catalytic activity and catalyst life, as discussed in, for example, Japanese examined patent publication No. 54-10942. It has now been found that a catalyst used for hydrocracking heavy hydrocarbon oils at a high temperature should have a larger pore volume in pores with a large pore diameter as compared with such a hydrotreatment catalyst. Heavy components of a heavy hydrocarbon oil can be classified into maltens (components soluble in n-pentane), resins (components soluble in n-heptane but insoluble in n-pentane) and asphaltenes (components insoluble in n-heptane). The H/C of respective components decreases and the molecular weight thereof increases in the written order and, therefore, the convertibility thereof into carbonaceous matters increases in the written order. Accordingly, in order to reduce the formation of carbonaceous matters during hydrocracking, it is necessary for the catalyst to have much pores with a large pore diameter so that large molecules such as resins and asphaltenes can be sufficiently diffused into the pores of the catalyst. If such macromolecules fail to enter into the pores of the catalyst, then tyey will undergo thermal cracking outside of the pores to form a large amount of carbonaceous matters.

Thus, a significant amount of pores with a diameter of at least 200 Å is required for facilitating the intrapore diffusion of the macromolecules. However, too large a pore volume in pores with too large a pore diameter causes the reduction in surface area (thus in catalytic activity) and in mechanical strength or crushing strength. Especially, pores with a diameter of 1000 Å or more have a great influence on the mechanical strength. Therefore, the catalyst of the present invention must have such pore characteristics as described previously. The specific surface area of the catalyst of the present invention is not specifically limited but is preferably 10–300 m$^2$/g, more preferably 50–150 m$^2$/g. In the present specification, the pore characteristics of the catalyst are determined by a mercury penetration method using a mercury penetration porosimeter (6000 psi, made by Aminco Ltd.). The determination was made with a mercury surface tension of 480 dyn./cm and a contact angle of 140. The surface properties of the catalysts were determined by a nitrogen desorption method using a SORPTOMATIC series-1800 instrument made by Shimadzu Seisakusho Co., Ltd.

The carrier of the catalyst of this invention is composed mainly of alumina or titania. Although alumina or titania may be used by itself as a carrier, it is preferred that alumina or titania be used in combination with one or more inorganic metal oxides. Illustrative of the especially preferred carriers are an alumina-titania carrier with 67–69 wt % of alumina and 33–5 wt % of titania, an alumina-silica carrier with 67–95 wt % of alumina and 33–5 wt % of silica, an alumina-boria carrier with 80–95 wt % of alumina and 20–5 wt % of boria, an alumina-phosphia carrier with 80–95 wt % of alumina and 20–5 wt % of phosphia, an alumina-zirconia carrier with 67–90 wt % of alumina and 33–10 wt % of zirconia, a titania-silica carrier with 65–90 wt % of titania and 35–10 wt % of silica, a titania-zirconia carrier with 65–90 wt % of titania and 35–10 wt % of zirconia, a titania-alumina carrier with 65–90 wt % of titania and 35–10 wt % of alumina, a titania-phosphia carrier with 80–95 wt % of titania and 20–5 wt % of phosphia and a titania-boria carrier with 80–95 wt % of titania and 20–5 wt % of boria.

The catalyst of the present invention may be prepared in any known manner. The method disclosed in U.S. Pat. No. 4,248,852 is suitably applicable for the preparation of the catalyst of this invention containing alumina as a carrier material. In the method of U.S. Pat. No. 4,248,852, activated alumina is produced using boehmite or pseudoboehmite as hydrated alumina. The crystal form of the resulting activated alumina depends on the calcination temperature of the hydrated alumina. For example, a calcination temmperature of 400°–800° C. gives γ (gamma)-alumina, a calcination temperature of 800°–1150° C. gives θ (theta)-alumina and a calcination over 1150° C. results in the formation of α (alpha)-alumina. Of these, the use of γ or θ-alumina is preferred and the use of α-alumina is less preferred because of its high content of pores with a diameter of over 1000 Å. By employing other methods than the aforementioned, it is possible to obtain η (eta)-alumina, χ (chi)-alumina, etc. These alumina can be used for the purpose of the present invention so far as their pore characteristics satisfy the aforementioned conditions.

Titania-series carriers useful for the preparation of the catalyst of the present invetntion may be advantageously prepared in accordance with the method disclosed in Japanese examined patent publication No. 53-44431. Titania can be anatase or rutile. Rutile-type titania has generally a smaller specific surface area and, therefore, a lower catalytic activity in comparison with the anatase-type. Since the sintering temperature for titania can be much lower than that for alumina, it is possible to obtain a titania carrier with a desired pore characteristics by merely controlling the sintering temperature.

The mixed oxide carriers can be prepared by a co-precipitation method, a gel mixing method, an immersion method, etc. The co-precipitation method disclosed in Japanese published unexamined patent application No. 56-120508 is suitably employed for the preparation of alumina-titania, alumina-silica, alumina-zirconia, titania-silica, titania-zirconia, etc. A mixed oxides carrier may also be prepared by a method including providing hydrated alumina or titania, and mixing a water-soluble salt of another metal for neutralization thereof and for the precipitation of the mixed hydroxides. Alumina-boria, alumina-phosphia, titania-boria and titania-phosphia may preferably be obtained by a method which includes providing extrudates of alumina or titania having the desired pore characteristics, impregnating the extrudates with an aqueous solution of a boron or phosphor compound, and drying and calcining the resulting impregnated material.

Various known methods are available for supporting the catalyst metal components on the carrier, such as an immersion method and an impregnation method. The catalyst metal components containing the first or second auxiliary element may be supported separately from the main component, V or Mo. Provided that a homogeneous and stable solution of compounds of respective element is available, both elements may be supported simultaneously on the carrier. Water-insoluble compounds can be used together with a suitable solvent therefor for immersion or impregnation of the carrier, though the use of water soluble compounds is desirable. Water-soluble compounds include water-soluble salts in which the metal elements form cations or oxyacid anions. Examples of water-soluble salts providing cations of the metal elements include chlorides, nitrates, sulfates, acetates and oxalates. In the case of elements providing anionic oxyacids, the use of ammonium salts is preferred since ammonium can be converted into gases upon firing to remain only the oxide of the desired metal elements. Illustrative of suitable water-soluble salts of the main elements are ammonium metavanadate and vanadyl oxalate, ammonium paramolybdate and ammonium metamolybdate. Illustrative of suitable water-soluble salts of the first and second auxiliary elements are chlorides and nitrates.

Description will now be made on the process for hydrocracking heavy hydrocarbon oils using the above-described catalyst of the present invention. The catalyst of the present invention may be utilized for hydrocracking any hydrocabon oils such as residual oils and vacuum gas oils. However, in view of the fact that the catalyst of this invention can prevent the formation of carbonaceous matters even at a temprature of 420°–480° C., it is advantageous to use the catalyst for hydrocracking heavy hydrocarbon oils such as vacuum residues, atmospheric residues, liquified coal oils, extracted oils from tar sand, shale oils, etc. The hydrocracking of heavy hydrocarbon oils is generally performed at a temperature of 420°–480° C., preferably 440°–460° C., a hydrogen pressure of 100–250 Kg/cm², preferably 120–180 Kg/cm², and an liquid hourly space velocity of 0.1–10 hr⁻¹, preferably 0.2–2.0 hr⁻¹.

The catalyst of the present invention has a tendency to be irrevocably poisoned by the metal compounds contained in the feedstock. Therefore, when the feedstock contains a large amount of metal components, it is advisable to previously introduce the feedstock into a guard reactor for demetallization or to effect the hydrocracking at a low liquid hourly space velocity. The process of this invention is advantageously applied for the hydrocracking of hydrocarbon oils having a total content of Ni and V of not greater than 500 ppm, more preferably not greater than 300 ppm.

Because of the long catalyst life, the process of the present invention is advantageously effected in a fixed bed system. In this, case, the process can be continued until the catalyst life expires. However, the process can be also effected using fluidized bed or moving bed system. In this case, the process can be operated without difficulty and economically since the feed rate of the catalyst can be maintained at a low level.

The hydrocracking is performed at a temperature of about 420°–480° C. At a temperature lower than about 420° C., thermal cracking of the hydrocarbon oil cannot proceed satisfactorily. A temperature over 480° C. is disadvantageous because hydrocarbon radicals are produced in so large an amount that hydrogenation (or quenching by hydrogen) of the radicals by the action of the catalyst cannot be effected sufficiently, resulting in the formation of a large amount of carbonaceous matters. The higher the hydrogen pressure, the larger becomes the amount of hydrogen dissolved in the oil in the reaction zone and, therefore, the rate of the catalytic hydrogenation becomes faster. Further, a high hydrogen pressure is effective in lowering the rate of deposition of coke on the catalyst which becomes high when the hydrocracking is performed at a high temperature. Accordingly, it is preferable to effect the hydrocracking at a high hydrogen pressure for the reason that the catalyst may exhibit high activities for a long period of time. However, too high a hydrogen pressure requires a large apparatus and is not advantageous from the standpoint of economy. Thus, the process of the present invention is generally carried out at a hydrogen pressure of about 100–250 Kg/cm².

The liquid space velocity is generally determined by the reaction temperature and the intended conversion of heavy components of the feed stock, since thermal cracking is predominant in the hydrocracking according to the present invention. In the case of the treatment of a metal components-rich hydrocarbon feedstock, however, it is advisable to determine the optimum space velocity from a consideration of the catalyst life. The process of the present invention is conducted at a liquid hourly space velocity of 0.1–10 hr⁻¹.

The following examples and the accompanying drawings will further illustrate the present invention.

In the drawings:

FIGS. 1 through 3 are graphs showing the change in amount of the toluene insolubles in product oils in relation with the change in process time using the catalysts obtained in the Examples 1 through 3; and FIGS. 4(a) and 4(b) are explanatory views schematically illustrating the arrangement of the catalyst layers in the reactors used in the Example 11.

EXAMPLE 1

Four kinds of boehmite sol were prepared by alternately adding an aqueous aluminum nitrate solution and an aqueous ammonia repeatedly (7–18 times in total) in accordance with the method disclosed in U.S. Pat. No. 4,248,852. Each sol, after being filtered and washed, was shaped by means of an extruder having a nozzle diameter of 1.0 mm. The resulting extrudates were then dried and calcined at 500° C. to obtain four types of alumina carriers A-01, A-02, A-03 and A-04. Each alumina carrier was then impregnated with an aqueous solution containing vanadyl oxalate and cupric nitrate in an equal molar proportion and then dried. Such an impregnation and drying operation was repeated once more to obtain four types of catalysts B-01, B-02, B-03 and B-04 whose properties were as shown in Table 1.

TABLE 1

| Catalyst | B-01 | B-02 | B-03 | B-04 |
|---|---|---|---|---|
| Carrier | A-01 | A-02 | A-03 | A-04 |
| Metal Content (Wt %)* | | | | |
| V | 5.5 | 5.5 | 5.5 | 5.5 |
| Cu | 6.9 | 6.9 | 6.9 | 6.9 |
| Specific Surface Area (m$^2$/g) | 186 | 130 | 93 | 65 |
| Pore Volume (cc/g) | | | | |
| <100Å | 0.05 | 0.03 | 0.03 | 0.02 |
| 100~200Å | 0.67 | 0.10 | 0.06 | 0.04 |
| 200~300Å | 0.07 | 0.18 | 0.06 | 0.03 |
| 300~400Å | 0.05 | 0.41 | 0.07 | 0.03 |
| 400~1000Å | 0.05 | 0.30 | 0.68 | 0.21 |
| >1000Å | 0.00 | 0.02 | 0.02 | 0.69 |
| Total | 0.89 | 1.04 | 0.92 | 1.02 |

*Based on carrier

EXAMPLE 2

The alumina carrier A-02 obtained in Example 1 was impregnated with an aqueous solution of ammonium paramolybdate, followed by drying and calcination, thereby obtaining a catalyst C-00 having 6 wt % of Mo calculated as elemental Mo and based on the weight of the carrier.

The Mo-carrying C-00 catalyst was further treated for supporting thereon Cu, La or Ni as an auxiliary metal. Thus, a portion of the C-00 catalyst was impregnated with an aqueous solution containing a soluble salt of each of Cu, La and Ni, followed by drying and calcination to give C-01, C-02 and C-03 catalysts each having an atomic ratio of the auxiliary metal to Mo of 1:1. Further, the C-00 catalyst was impregnated with an aqueous solution of ammonium paramolybdate, dried and then calcined, thereby obtaining a catalyst C-04 having a Mo content of 11.4% based on the carrier. The pore characteristics of the catalysts C-01 through C-04 (of these, C-01 and C-02 are catalysts according to the present invention) were found to be almost the same as those of the B-02 catalyst.

EXAMPLE 3

The A-02 alumina carrier prepared in Example 1 was impregnated with an aqueous solution of vanadyl oxalate, followed by drying and calcination to obtain a catalyst D-00 having a V content of 5.5 wt % based on the weight of the carrier. Portions of the D-00 catalyst were then impregnated with aqueous solutions of nickel nitrate and lead nitrate, respectively. The calcination, after drying, of the resulting materials gave catalysts D-01 and D-02 with Ni and Pb contents of 5.5% each based on the weight of the carrier. A further portion of the D-00 catalyst was impregnated with an aqueous vanadyl oxalate solution, followed by drying and calcination, thereby obtaining a catalyst D-03 with a V content of 11.0 wt % based on the carrier. The catalysts D-01 through D-03 (of these, D-01 and D-02 are catalysts according to the present invention) were found to have almost the same pore distribution as that of the B-02 catalyst.

EXAMPLE 4

Extrudates of alumina-titania, alumina-silica and alumina-zirconia were prepared in accordance with the method disclosed in Japanese published unexamined patent application No. 55-19597. The diameter of each of the three types of extrudates was found to be within the range of 0.8–0.9 mm after calcined at 500° C. The extrudates were then treated in the same manner as described in Example 1 to obtain catalysts E-01, E-02 and E-03, each having a V content of 5.5% and a Cu content of 6.9% based on the weight of the carrier. The pore characteristics of these catalysts are shown in Table 2.

EXAMPLE 5

Portions of the A-03 alumina carrier obtained in Example 1 were impregnated with aqueous solutions of boric acid and ammonium phosphate, respectively, followed by drying and calcination, thereby obtaining two types of carriers having a boron content (calculated as boria) and a phosphor content (calculated as phosphia) of 12 wt % and 8 wt %, respectively, based on the carrier. The thus obtained carriers were then treated in the same manner as described in Example 1 to give catalysts E-04 and E-05 each having a V content of 5.5 wt % and a Cu content of 6.9 wt % based on the carrier. The pore characteristics of the catalysts are shown in Table 2.

TABLE 2

| Catalyst | E-01 | E-02 | E-03 | E-04 | E-05 |
|---|---|---|---|---|---|
| Composition of Carrier (Wt %) | | | | | |
| Al$_2$O$_3$ | 70 | 60 | 70 | 88 | 92 |
| TiO$_2$ | 30 | — | — | — | — |
| SiO$_2$ | — | 40 | — | — | — |
| ZrO$_2$ | — | — | 30 | — | — |
| B$_2$O$_3$ | — | — | — | 12 | — |
| P$_2$O$_5$ | — | — | — | — | 8 |
| Composition of Catalyst Metal (Wt %)* | | | | | |
| V | 5.5 | 5.5 | 5.5 | 5.5 | 5.5 |
| Cu | 6.9 | 6.9 | 6.9 | 6.9 | 6.9 |
| Specific Surface Area (m$^2$/g) | 110 | 200 | 75 | 110 | 122 |
| Pore Volume (cc/g) | | | | | |
| <100Å | 0.03 | 0.05 | 0.02 | 0.02 | 0.02 |
| 100~200Å | 0.05 | 0.10 | 0.03 | 0.08 | 0.08 |
| 200~300Å | 0.48 | 0.26 | 0.14 | 0.16 | 0.18 |
| 300~400Å | 0.23 | 0.31 | 0.14 | 0.35 | 0.40 |
| 400~1000Å | 0.12 | 0.18 | 0.08 | 0.27 | 0.25 |
| >1000Å | 0.04 | 0.02 | 0.03 | 0.01 | 0.01 |
| Total | 0.95 | 0.92 | 0.44 | 0.89 | 0.94 |

*Based on carrier

EXAMPLE 6

Into 500 parts by weight of deionized water contained in a corrosion-resistive vessel a quantity of titanium tetrachloride was gradually added with stirring for dissolution. The vessel containing the resultant aqueous solution was placed in an ice bath for cooling, to which were gradually added an aqueous ammonia obtained by diluting 240 parts by weight of 28% ammonia with 510 parts by weight of deionized water, while maintaing the content in the vessel at a temperature not exceeding 90° C., thereby obtaining a white slurry. The slurry was, after being aged at 80° C. for 24 hours, filtered and the thus obtained precipitate was washed with a 0.1% aqueous ammonium sulfate solution until no chlorine ion was detected in the filtrate. The washed product, which was a white cake containing 30 wt% of titania, was used for the preparation of the following titania-series carriers F-00 through F-05.

200 Parts by weight of the titania cake were, after being dried at 250° C. for 15 hours, mixed with 6 parts by weight of Avicell (microcrystalline cellulose) and the mixture was, after being added with a quantity of water for the adjustment of its water content, kneaded and extrusion molded. The extrudates were then calcined at 700° C. for 5 hours to obtain the titania carrier F-00.

100 Parts by weight of the titania cake was, after being dispersed into 1000 parts by weight of deionized water, mixed well with 20 parts by weight of a water glass having a $SiO_2/Na_2O$ ratio of 3, to which was added 1 N sulfuric acid to adjust the pH of the mixture to 7.5. The resulting mixture was, after being aged at 60° C. for 6 hours, filtered and the precipitate was washed with water until no sulfate ion was detected in the filtrate. The washed precipitate was sufficiently dehydrated and then subjected to an extrusion molding. The calcination of the extrudates at 600° C. for 3 hours gave the titania-silica carrier F-01.

100 Parts by weight of the titania cake were, after being dispersed into 500 parts by weight of deionized water, mixed with 300 parts by weight of an aqueous aluminum sulfate solution (8 parts by weight in terms of alumina), to which was added 5 N ammonia water to obtain a slurry with a pH value of 6.0. After being aged at 80° C. for 24 hours, the slurry was filtered and the precipitate was washed with water until no sulfate ion was detected in the filtrate. The washed product was dehydrated to form a cake, which in turn was extrusion molded. The calcination of the extrudates at 600° C. for 5 hous gave the titania-alumina carrier F-02.

100 Parts by weight of the titania cake were, after being dispersed into 500 parts by weight of deionized water, mixed with 500 parts by weight of an aqueous zirconyl chloride solution (20 parts by weight in terms of zirconia), to which was added 2 N NaOH aqueous solution to adjust the pH of the Zr-containing solution to 8.0. After being aged at 95° C. for 24 hours, the resulting slurry was filtered and the precipitate was washed well with water until no chlorine ion was detected. The washed product was dehydrated to form a cake which in turn was extrusion molded. The calcination of the extrudates at 700° C. for 5 hours gave the titania-zirconia carrier F-03.

The F-00 titania carrier was divided into halves, which were then impregnated with an aqueous boric acid solution and an ammonium phosphate solution, respectively. Each of the impregnated materials was dried at 120° C. for 5 hours and then calcined at 650° C. for 4 hours to obtain the titania-boria carrier F-04 having a boria content of 6 wt % and the titnia-boria carrier F-05 having a phosphia content of 6 wt %, both based on the carrier.

The thus obtained 5 types of carriers F-01 through F-05 were each treated in the same manner as described in Example 1 to support vanadium and copper in amounts of 4 wt % and 5 wt %, respectively, to obtain 5 types of catalysts F-11 through F-15 whose properties are shown in Table 3.

TABLE 3

| Catalyst | F-11 | F-12 | F-13 | F-14 | F-15 |
|---|---|---|---|---|---|
| Composition of Carrier (Wt %) | | | | | |
| $TiO_2$ | 82 | 78 | 60 | 94 | 94 |
| $SiO_2$ | 18 | — | — | — | — |
| $Al_2O_3$ | — | 22 | — | — | — |
| $ZrO_2$ | — | — | 40 | — | — |
| $B_2O_3$ | — | — | — | 6 | — |
| $P_2O_5$ | — | — | — | — | 6 |
| Composition of Catalyst Metal | | | | | |

TABLE 3-continued

| Catalyst | F-11 | F-12 | F-13 | F-14 | F-15 |
|---|---|---|---|---|---|
| (Wt %)* | | | | | |
| V | 4 | 4 | 4 | 4 | 4 |
| Cu | 5 | 5 | 5 | 5 | 5 |
| Specific Surface Area ($m^2/g$) | 68 | 55 | 36 | 41 | 30 |
| Pore Volume (cc/g) | | | | | |
| <100Å | 0.02 | 0.01 | 0.0 | 0.0 | 0.0 |
| 100~200Å | 0.02 | 0.03 | 0.03 | 0.04 | 0.01 |
| 200~300Å | 0.18 | 0.15 | 0.05 | 0.05 | 0.04 |
| 300~400Å | 0.12 | 0.17 | 0.12 | 0.10 | 0.08 |
| 400~1000Å | 0.04 | 0.06 | 0.11 | 0.10 | 0.16 |
| >1000Å | 0.01 | 0.02 | 0.02 | 0.01 | 0.02 |
| Total | 0.39 | 0.44 | 0.33 | 0.30 | 0.31 |

*Based on carrier

EXAMPLE 7

An Arabian light atmospheric residue having properties shown in Table 4 was subjected to hydrocracking conditions shown in Table 5 using a fixed bed formed of each of the B-01 through B-04 catalysts obtained in Example 1. The results of the hydrocracking were shown in FIG. 1 with respect to the relationship between the process time and the toluene insoluble content in the product oil. The toluene insoluble content corresponds to the amount of carbonaceous matters formed by the reaction.

TABLE 4

| Specific Gravity(D15/4) | 0.965 |
|---|---|
| Viscosity(C.P.,50° C.) | 142 |
| Sulfur Content(Wt %) | 3.0 |
| Nitrogen Content(Wt %) | 0.17 |
| Conradson Carbon Residue(Wt %) | 8.3 |
| n-Heptane Insolubles(Wt %) | 2.1 |
| Toluene Insolubles(Wt %) | 0 |
| V content(Wt-ppm) | 29 |
| Ni Content(Wt-ppm) | 8 |

TABLE 5

| L H S V($hr^{-1}$) | 0.5 |
|---|---|
| Temperature(°C.) | 450 |
| Hydrogen Pressure(kg/$cm^2$) | 140 |
| Hydrogen/Oil Ratio(Nl/l) | 2000 |

From the results shown in FIG. 1, it will be appreciated that the catalysts of the present invention (B-02, curve 102 and B-03, curve 103) can prevent carbonaceous matters from forming in the product oil for a long period of time. The catalyst B-01 (curve 101), which has an excessively large pore volume in pores with a diameter of below 200 Å, is short in catalyst life though it can prevent the formation of carbonaceous matters in the early stage of the process. On the other hand, the catalyst B-04 (curve 104) having an excessively large pore volume in pores with a diameter of 1000 Å or more, fails to inhibit the formation of carbonaceous matters even at an early stage of the process.

EXAMPLE 8

Example 7 was repeated in the same manner as described with the use of the catalysts C-01 through C-04 in place of the catalysts B-01 through B-04. The results are shown in FIG. 2. As will be seen from FIG. 2, the catalysts C-03 (curve 107, Mo+Ni) and C-04 (curve 108, Mo alone) have a much shorter catalyst life as compared with the catalysts of the present invention, C-01 (curve 105, Mo+Cu) and C-02 (curve 106, Mo+La).

EXAMPLE 9

Example 7 was repeated in the same manner as described with the use of the catalysts D-01 through D-03 in place of the catalysts B-01 through B-04. The results are shown in FIG. 3 together with the results for the catalyst B-02. As is evident from FIG. 3, the catalyst life of the catalyst D-03 (curve 111, V alone) is much shorter than the catalysts B-02 (curve 102, V+Cu), D-01 (curve 109, V+Ni) and D-02 (curve 110, V+Pb) of the present invention.

EXAMPLE 10

The hydrocracking of the Arabian light atmospheric residue having properties shown in Table 4 was carried out for 1000 hours in the same manner as described in Example 7 using each of the catalysts E-01 through E-05 and F-11 through F-15. The content of toluene insolubles in the product oil at 1000 hours process time and the 1000° F.+ conversion at 500 hours process time in each test are shown in Table 6 together with those in the case of the catalyst B-02.

TABLE 6

| Catalyst | Toluene Insolubles (Wt %) | 1000° F. + Conversion* (%) |
| --- | --- | --- |
| B-02 | 0.055 | 65 |
| E-01 | 0.06 | 69 |
| E-02 | 0.07 | 72 |
| E-03 | 0.07 | 70 |
| E-04 | 0.07 | 73 |
| E-05 | 0.06 | 69 |
| F-11 | 0.06 | 70 |
| F-12 | 0.05 | 68 |
| F-13 | 0.07 | 68 |
| F-14 | 0.07 | 69 |
| F-15 | 0.06 | 69 |

*1000° F. + Conversion = $\frac{A - B}{A} \times 100\%$

A = Volume of components heavier than 1000° F. in the feedstock
B = Volume of components heavier than 1000° F. in the product oil It will be appreciated from the results summarized in Table 6 that the carriers formed of alumina or titania and other inorganic oxides may exhibit superior 1000° F+ conversion in comparison with the B-02 catalyst whose carrier is formed of alumina alone.

EXAMPLE 11

Using the alumina carrier A-02 obtained in Example 1, 11 types of catalysts, G-01 through G-11, carrying Cr, W, Ni, Co, Fe, Pd, Pt, Rh, Cu, Ag and U, respectively, were prepared by impregnation with respective aqueous solutions containing corresponding metal salts, followed by drying and calcination. The C-00 alumina catalyst carrying Mo alone and obtained in Example 2 was further modified to obtain 7 types of catalysts, H-01 through H-07, carrying Ag, Sn, Zn, Pb, Co, Na and Ce, respectively, as an auxiliary metal, by impregnation with corresponding salt solutions, followed by drying and calcination. Similarly, 12 types of catalysts, I-01 through I-12, carrying Fe, Co, Ag, Zn, Sn, Cr, Mo, Cd, La, Na, Mg and Rh, respectively, as an auxiliary metal, were prepared using the D-00 alumina catalyst containing V alone and obtained in Example 3. Further, using the above G-01 alumina catalyst carrying Cr alone, two types of catalysts J-01 and J-02, carrying Cr alone, two types of catalysts J-01 and J-02, carrying Ni and Co, respectively, were prepared. Moreover, the above G-02 catalyst carrying W alone was treated to obtain a K-01 catalyst having Ni and W. The thus obtained 33 kinds of catalysts, together with the catalysts B-02, C-03, C-04 and D-03, were tested for examination of their catalytic performance in the following manner.

Into a tubular reactor with an inside volume of 600 cc were packed successively with 19 types of catalysts in the order shown in FIG. 4(a). Each catalyst layer had a volume of 15 cc and a stainless steel wire net was provided between each adjacent catalyst layers. Generally, coke and metals have a tendency to deposit on the catalyst paticles located in the inlet portion of the reactor. Thus, in the present experiment, the upper portion of the reactor was provided with a thick layer of the B-02 catalyst having a volume of 200 cc so that the other catalyst layers located beneath the thick B-02 catalyst layer were subjected to substantially the same conditions. In order to check that the deterioration of respective catalysts had no relevance to the position thereof in the reactor, two catalyst layers formed of the same catalyst were provided adjacent to the thick B-02 catalyst layer (R-1) and at the bottom of the reactor (R-2). In the same manner as described above, another reactor was packed with the other catalysts as shown in FIG. 4(b).

Then, Arabian light atmospheric residue having properties shown in Table 4 was continuously streamed into each of the reactors at a liquid hourly space velocity of 0.4 hr$^{-1}$, a temperature of 440° C. and a hydrogen pressure of 140 kg/cm$^2$G with a hydrogen to oil ratio of 2000 Nl/l for 2000 hours for hydrocracking of the oil and for aging of the catalyst. After termination of the hydrocracking operation, a gas oil was streamed into each reactor to wash respective catalyst layers. Then each of the aged catalysts was taken out of the reactors for the analysis of plugging of its pores and for the examination of its remaining catalytic activity.

5 cc of each of the aged catalysts were washed repeatedly with toluene by means of Soxhlet's extractor until the toluene extractant did not color. The Al content and the pore volume of each washed sample were then measured to calculate the degree of plugging of its pores in accordance with the following equation:

Plugging of pores =

$$\frac{\text{Pore volume of aged catalyst (cc/g)}}{\text{Pore volume of fresh catalyst (cc/g)}} \times \frac{\text{Al content of fresh catalyst (wt \%)}}{\text{Al content of aged catalyst (wt \%)}}$$

Another 5 cc of each of the aged catalysts were mixed with 10 cc of fused alumina of 100–150 mesh and the mixture was packed in a reactor with an inside volume of 20 cc. The Arabian light atmospheric residue having properties shown in Table 4 was then streamed into the reactor for hydrocracking under the conditions shown in Table 5 for 8 hours. The remaining catalytic activity of each catalyst was determined in terms of the content of toluene insolubles in the product oil at 8 hours process time. The plugging of pores and the remaining catalytic activity of each of the aged catalysts are shown in Table 7.

TABLE 7

| Catalyst | Position of Packed Catalyst Layer | Catalyst Metal (Wt %)* | Plugging of Pores (%) | Remaining Catalyst Activity (Wt %)** |
|---|---|---|---|---|
| D-03 | 26 | V(11.0)- | 53 | 0.12 |
| I-01 | 2 | V(5.5) Fe(5.5) | 35 | 0.04 |
| I-02 | 35 | V(5.5) Co(5.5) | 35 | 0.04 |
| I-03 | 20 | V(5.5) Ag(5.5) | 32 | 0.05 |
| I-04 | 8 | V(5.5) Zn(5.5) | 37 | 0.05 |
| I-05 | 5 | V(5.5) Sn(5.5) | 31 | 0.06 |
| I-06 | 25 | V(5.5) Cr(5.5) | 62 | 0.13 |
| I-07 | 29 | V(5.5) Mo(5.5) | 68 | 0.17 |
| I-08 | 17 | V(5.5) Cd(5.5) | 50 | 0.14 |
| I-09 | 32 | V(5.5) La(5.5) | 51 | 0.12 |
| I-10 | 11 | V(5.5) Na(5.5) | 53 | 0.11 |
| I-11 | 23 | V(5.5) Mg(5.5) | 37 | 0.16 |
| I-12 | 14 | V(5.5) Rh(5.5) | 54 | 0.13 |
| B-02 | R-1 | V(5.5) Cu(6.9) | 34 | 0.05 |
| B-02 | R-2 | V(5.5) Cu(6.9) | 38 | 0.06 |
| B-02 | R-3 | V(5.5) Cu(6.9) | 36 | 0.05 |
| B-02 | R-4 | V(5.5) Cu(6.9) | 38 | 0.05 |
| C-04 | 7 | Mo(11.4)- | 67 | 0.16 |
| H-01 | 28 | Mo(6.0) Ag(5.5) | 52 | 0.05 |
| H-02 | 15 | Mo(6.0) Sn(5.5) | 50 | 0.06 |
| H-03 | 12 | Mo(6.0) Zn(5.5) | 48 | 0.05 |
| H-04 | 34 | Mo(6.0) Pb(5.5) | 45 | 0.07 |
| H-05 | 18 | Mo(6.0) Co(5.5) | 67 | 0.15 |
| C-03 | 21 | Mo(6.0) Ni(3.7) | 65 | 0.16 |
| H-06 | 4 | Mo(6.0) Na(5.5) | 68 | 0.21 |
| H-07 | 24 | Mo(6.0) Ce(5.5) | 58 | 0.07 |
| G-01 | 13 | Cr(11.0) | 25 | 0.12 |
| J-01 | 6 | Cr(5.5) Ni(5.5) | 30 | 0.13 |
| J-02 | 27 | Cr(5.5) Co(5.5) | 28 | 0.15 |
| G-02 | 31 | W(11.0) | 36 | 0.14 |
| K-01 | 30 | W(5.5) Ni(5.5) | 57 | 0.18 |
| G-03 | 1 | Ni(11.0) | 33 | 0.16 |
| G-04 | 10 | Co(11.0) | 40 | 0.18 |
| G-05 | 33 | Fe(11.0) | 43 | 0.21 |
| G-06 | 3 | Pd(11.0) | 37 | 0.15 |
| G-07 | 16 | Pt(11.0) | 39 | 0.13 |
| G-08 | 36 | Rh(11.0) | 45 | 0.11 |
| G-09 | 19 | Cu(11.0) | 44 | 0.11 |
| G-10 | 22 | Ag(11.0) | 43 | 0.12 |
| G-11 | 9 | U(11.0) | 38 | 0.16 |

*Based on carrier
**The concentration of toluene insolubles in the product oil (Wt %)

It will be seen from the results summarized in Table 7 that the catalysts of the present invention I-01 through I-05, carrying V-Fe, V-Co, V-Ag, V-Zn and V-Sn, respectively are low in pore plugging and high in remaining catalytic activity. Although the catalysts of the present invention H-01 through H-04 and H-07, carrying Mo-Ag, Mo-Sn, Mo-Zn, Mo-Pb and Mo-Ce, respectively are high in pore plugging than the above mentioned V-series catalysts, they can show good remaining catalytic activity. In contrast, the known hydrodesulfurization catalysts C-03 (Mo-Ni), H-05 (Mo-Co), and K-01 (W-Ni) are, when aged, high in pore plugging and low in remaining catalytic activity, showing that they are short in catalyst life. In this regard, it will be noted that B-02 (V-Cu) catalysts located at positions R-1 through R-4 show almost the same results, indicating that the change in position of the catalyst in the reactor does not result in the difference in degree of deterioration of the catalyst.

EXAMPLE 12

The process of the present invention was operated for the treatment of Khafji vacuum residue having properties presented in Table 8 using the E-01 catalyst obtained in Example 4. The E-01 catalyst was packed in the same type of a tubular reactor as used in Example 11, through which the feedstock was streamed to effect the hydrocracking. The hydrocracking was performed at a temperature of 450° C., a hydrogen pressure of 140 Kg/cm$^2$G and a liquid hourly space velocity of 0.3 $^{-1}$ with a hydrogen/oil feed ratio of 2000 Nl/l. The properties of the product oil (C$_5$ and heavier components) obtained 1000 hours and 2500 hours after the commencement of the operation are shown in Table 8.

TABLE 8

|  | Feedstock | Product Oil (C$_5$+) At 1000 hr process time | Product Oil (C$_5$+) At 2500 hr process time |
|---|---|---|---|
| 1000° F. + Conversion (Wt %) | — | 97.0 | 96.1 |
| Content of 1000° F. + (Wt %) | 97.5 | 2.9 | 3.8 |
| Specific Gravity (d 15/4° C.) | 1.0404 | 0.9277 | 0.9312 |
| Sulfur Content (Wt %) | 5.56 | 1.5 | 1.8 |
| Conradson Carbon Residue (Wt %) | 23.1 | 4.1 | 4.5 |
| V + Ni Content (Wt-ppm) | 202 | 4 | 5 |
| Toluene Insolubles (Wt %) | 0 | 0.35 | 0.45 |

We claim:

1. A catalyst for hydrocracking heavy hydrocarbon oils, comprising:
   a porous inorganic carrier composed mainly of alumina or titania; and
   two or more catalytic metal components composited with said carrier, the metals of said catalytic metal components being either (a) V and at least one first auxiliary element selected from the group consisting of Zn, Fe, Co, Ni, Cu, Ag, Sn and Pb or (b) Mo and at least one second auxiliary element selected from the group consisting of Zn, Cu, Ag, Sn, Pb and the lanthanum-series elements,
   said catalyst having at least 60% of its total pore volume in pores with a diameter of 200 Å or more, at least 40% of its total pore volume in pores with a diameter of 300 Å or more and not more than 20% of its total pore volume in pores with a diameter of at least 1000 Å.

2. A catalyst as claimed in claim 1, wherein said carrier is composed mainly of alumina and further contains at least one oxide selected from the group consisting of silica, titania, zirconia, boria and phosphia.

3. A catalyst as claimed in claim 1, wherein said carrier is composed mainly of titania and further contains at least one oxide selected from the group consisting of silica, alumina, zirconia, boria and phosphia.

4. A catalyst as claimed in any one of claims 1 through 3, wherein the amount of the first or second auxiliary element or elements relative to the V or Mo is such that an atomic ratio Y/X, where Y stands for the first or second element or elements and X stands for V or Mo, is in the range of 0.1 to 3.0.

5. A process for hydrocracking a heavy hydrocarbon oil, comprising contacting the heavy hydrocarbon oil with a catalyst at a temperature of 420°–480° C., a hydrogen pressure of 100–250 Kg/cm$^2$ and a liquid hourly space velocity of 0.1–10 hr$^{-1}$, said catalyst including a porous inorganic carrier composed mainly of alumina or titania, and two or more catalytic metal components composed with said carrier, the metals of said catalytic metal components being either (a) V and at least one first auxiliary element selected from the group consisting of Zn, Fe, Co, Ni, Cu, Ag, Sn and Pb or (b) Mo and at least one second auxiliary metal component selected from the group consisting of Zn, Cu, Ag, Sn, Pb and the lanthanum-series elements, and said catalyst having at least 60% of its total pore volume in pores with a diameter of 200 Å or more, at least 40% of its total pore volume in pores with a diameter of 300 Å or more and not more than 20% of its total volume in pores with a diameter of at least 1000 Å.

6. A process as claimed in claim 5, wherein said contact of said hydrocarbon oil with said catalyst is effected by streaming said oil through a fixed bed of said catalyst.

* * * * *